Patented Oct. 3, 1922.

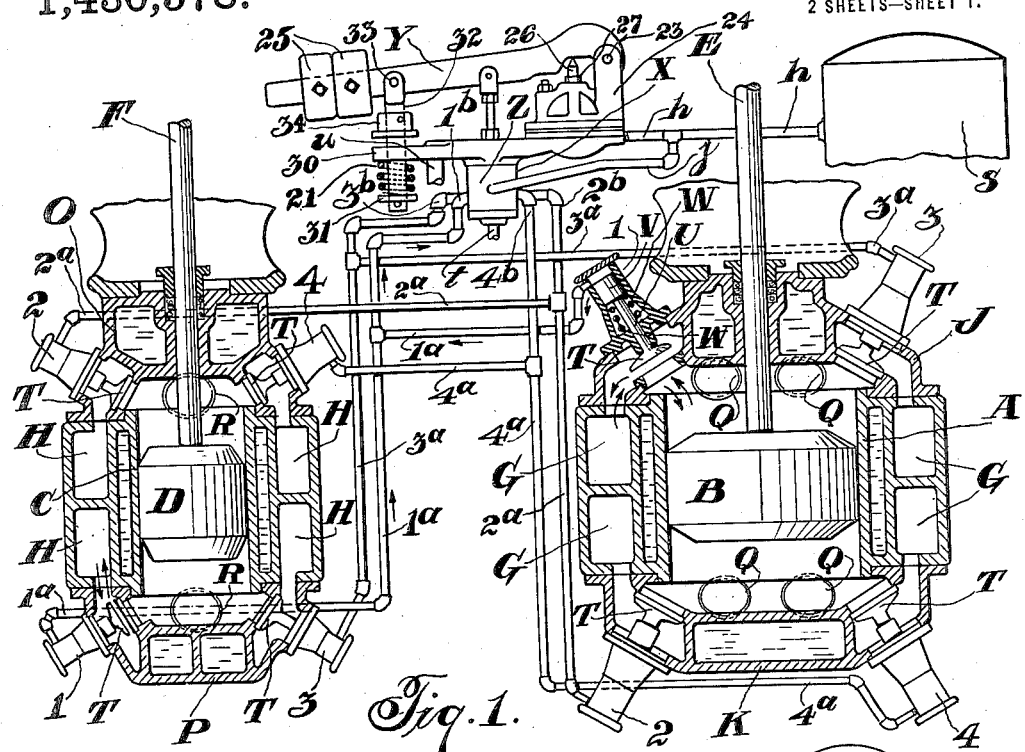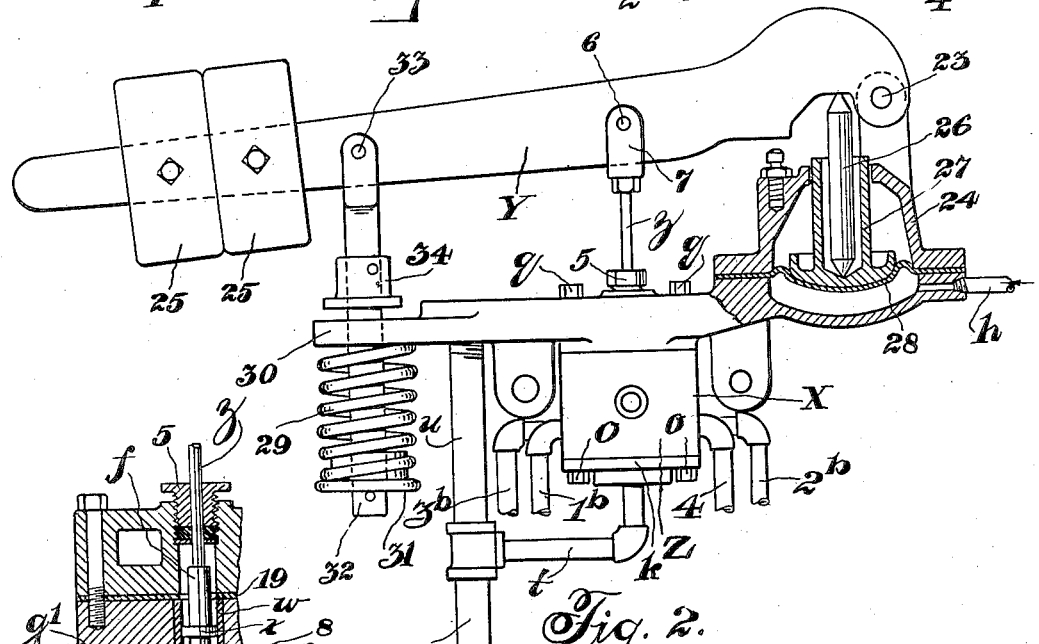

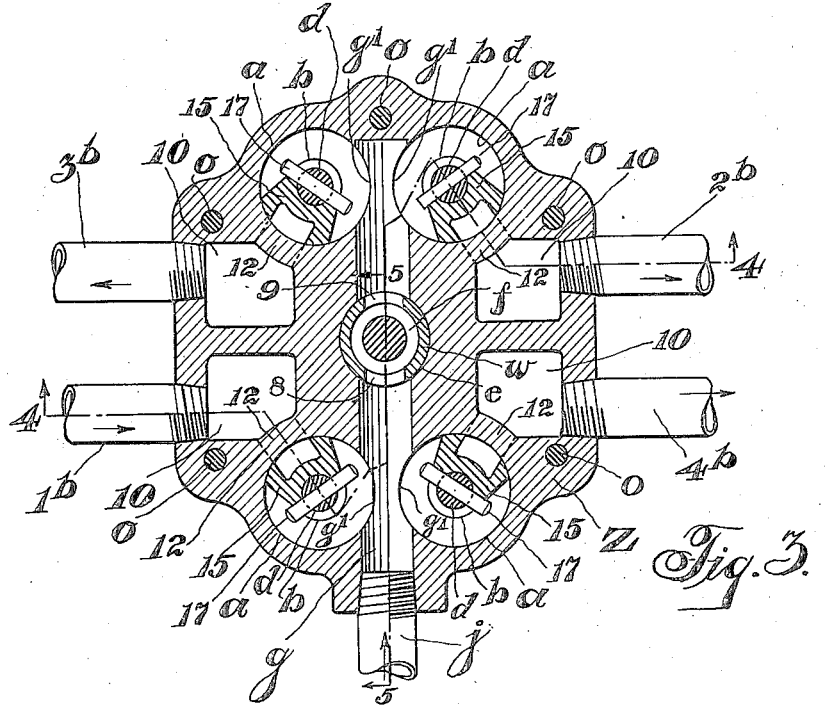
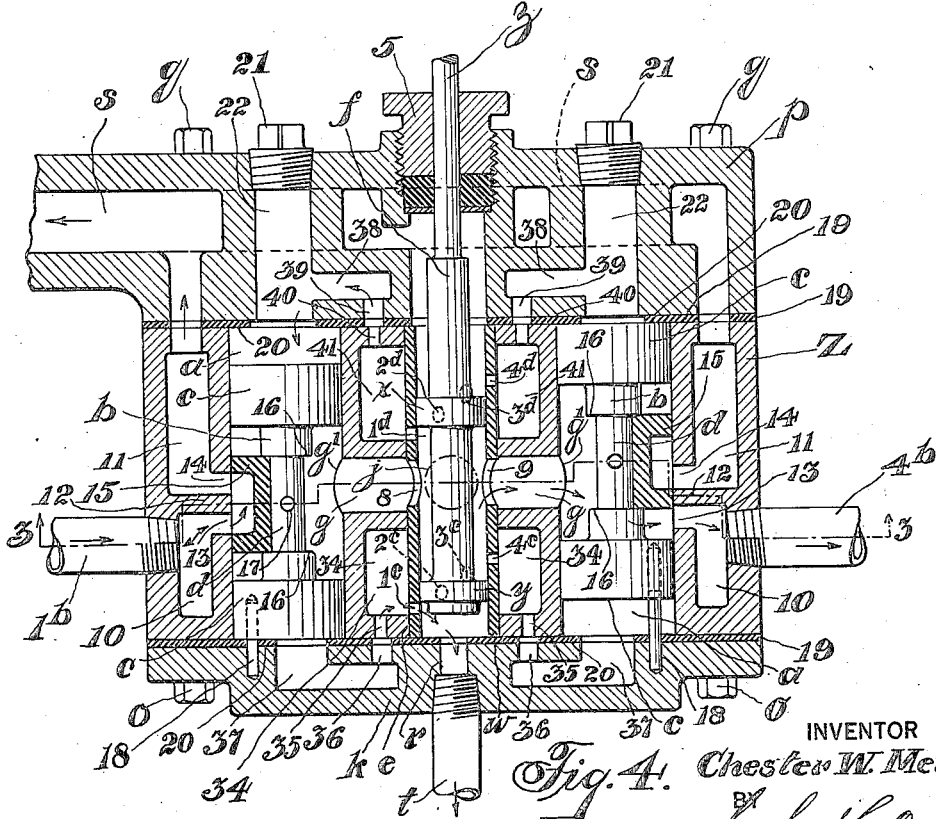

1,430,578

UNITED STATES PATENT OFFICE.

CHESTER W. METZGAR, OF EASTON, PENNSYLVANIA, ASSIGNOR TO INGERSOLL-RAND COMPANY, OF JERSEY CITY, NEW JERSEY, A CORPORATION OF NEW JERSEY.

COMPRESSOR REGULATOR.

Application filed August 3, 1921. Serial No. 489,626.

*To all whom it may concern:*

Be it known that I, CHESTER W. METZGAR, a citizen of the United States, and a resident of Easton, county of Northampton, and State of Pennsylvania, have invented a certain Compressor Regulator, of which the following is a specification accompanied by drawings.

This invention relates to regulators for fluid compressors, but more particularly to a regulator of the type disclosed in Letters Patent of the United States, Nos. 1,027,757; 1,027,758; and 1,027,760, granted May 28, 1912, to William Prellwitz, assignor to Ingersoll-Rand Company, in which type of regulator the movements of a plurality of main regulator valves for controlling the loading and unloading of the compressor, are controlled by an auxiliary regulator valve. With such a regulator, auxiliary receivers, which may be the clearance spaces of the compressor, are brought into and out of communication with the interior of the compressor cylinder or cylinders, for securing a step by step unloading or loading of the compressor, as the fluid in the main receiver tank reaches successively attained pressures.

The objects of the invention are in general to improve upon the construction and arrangement of the parts of the regulator, obtain even quicker action than heretofore, avoid any possible sticking of the regulator valves, cheapen the cost of manufacture, reduce the number of parts and produce them in a form more readily machined in the factory, provide shorter and more direct air passages, obtain better lubrication and secure a regulator which is more readily assembled and disassembled.

To these and other ends, which will hereinafter appear, the invention consists of the regulator hereinafter fully described and claimed in this specification and shown in the accompanying drawings, in which—

Figure 1 is a diagrammatic view partly in longitudinal section and partly broken away, of a two stage compressor having the regulator applied thereto, Figure 2 is an enlarged detail side elevation of the regulator partly in vertical section, Figure 3 is a transverse sectional plan view taken through the central portion of the regulator valve chest on the line 3—3 of Figure 4, Figure 4 is a diagrammatic vertical sectional view through the regulator valve chest on the line 4—4 of Figure 3 looking in the direction of the arrows, and assuming that the ports and passages have all been brought into one plane to better illustrate the distribution of the actuating fluid, and Figure 5 is a detail vertical sectional elevation through the valve chest on the line 5—5 of Figure 3 looking in the direction of the arrows.

The regulator is applicable to various types of compressors, whether single or multi-stage, but in the present instance I have chosen, for illustrative purposes, to show the regulator applied to a two stage compound compressor, having a low pressure cylinder A and double acting piston B, and a high pressure cylinder C and double acting piston D. The pistons having the piston rods E and F, may be driven from any suitable source or sources of power (not shown) and the cylinders are provided with the usual clearance spaces G and H communicating with the cylinders and controlled by suitable clearance valves T, having the valve casings 1, 2, 3 and 4 respectively, mounted on the air heads J and K of the cylinder A, and similar valves T, having valve casings 1, 2, 3 and 4 mounted on the air heads O and P of the cylinder B. The compressor valves Q for the cylinder A and the compressor valves R for the cylinder B, which may be of the plate type for instance, are mounted in the air heads and serve as inlet or discharge valves in the usual manner. The compressor cylinders are assumed to be connected by suitable piping to each other and to the main receiver tank S, the piping not being shown for the sake of simplicity.

Each clearance valve T, is provided with a stem U having a head V between which and the valve casing a compression spring W is preferably located, tending to open the valve, while the opposite side of the valve head is normally subjected to fluid pressure from the receiver S for closing the valve. The release of pressure from behind the valve heads V successively is controlled by a regulator X forming the subject matter of this invention, actuated by a fluid pressure device, which may be in the form of a diaphragm controlled lever Y movable in accordance with successively attained receiver pressures.

The valve casings 1, 2, 3 and 4 of the cylinder A are connected respectively to the similarly numbered valve casings 1, 2, 3 and 4 of the cylinder B by means of the pipes $1^a$, $2^a$, $3^a$ and $4^a$, which are in turn connected by branch pipes $1^b$, $2^b$, $3^b$ and $4^b$ to the valve chest Z of the regulator X, so that the clearance valves T are operated in pairs. The valve chest Z is provided with a plurality of main valve chambers $a$ conveniently arranged around a common center, and fluid actuated main regulator valves $b$ having the heads $c$ and the stems $d$, are longitudinally movable in the valve chambers for controlling the distribution of fluid to and from the valve casing 1, 2, 3 and 4, and the movements of the valves T for step by step loading and unloading of the compressor. An auxiliary valve chamber $e$ is located centrally in the valve chest Z between the main valve chambers $a$, and an auxiliary valve $f$, connected to be actuated by the fluid pressure lever Y, is longitudinally movable in the auxiliary valve chamber $e$, for controlling the distribution of fluid to the auxiliary valve chambers and the movements of the main regulator valves $b$.

The main valve chambers $a$ and auxiliary valve chamber $e$, preferably extend through the chest Z from end to end, and the main valve chambers are located in pairs, with the chambers of each pair sufficiently close together so that a common inlet passage $g$, extending transversely in the valve chest, substantially centrally intersects all of the main valve chambers $a$ at the ports $g'$ and also the auxiliary valve chamber $e$, as indicated diagrammatically in Figure 3 and shown also in Figure 5. This forms a simple construction and reduces the number of parts and passages in the valve chest. The main inlet passage $g$ is suitably connected to the pipe $h$ leading to the receiver, by means of the branch pipe $j$.

The valve chest Z is provided with an end plate $k$, in this instance a bottom plate, suitably secured thereto by means of the tap bolts $o$, and a cover $p$ is secured over the top of the valve chest by means of the tap bolts $q$. The end or botom plate $k$ is provided with an exhaust opening $r$ communicating with the central auxiliary valve chamber $e$ and adapted to be placed in communication successively with one end of each of the main valve chambers $a$ by suitable ports and passages in the valve chest Z and end plate $k$, controlled by the central auxiliary valve $f$. The cover $p$ is provided with an exhaust passage $s$, adapted to be placed in communication by suitable ports and passages in the valve chest and cover, successively with the other ends of the main valve chambers $a$ and with the branch pipes $1^b$, $2^b$, $3^b$ and $4^b$, leading to pairs of clearance valves T, for releasing the receiver pressure behind the pairs of clearance valves. Exhaust pipes $t$ and $u$ leading from the exhaust opening $r$ and the exhaust passage $s$ respectively, may be connected to a common exhaust pipe $v$ open to atmosphere.

Referring more particularly to the construction of the regulator, the valve chest Z may be formed of any suitable material, as for instance bronze, which does not rust and avoids sticking of the valves. A bushing $w$, also preferably of bronze, forms a lining for the central auxiliary valve chamber $e$, in which bushing the auxiliary valve $f$, having the heads $x$ and $y$, is actuated by means of the valve stem $z$ passing through the stuffing box 5 and pivotally connected to the fluid pressure lever Y at the point 6 by means of the yoke 7. The bushing $w$ is provided with central ports 8 and 9 and two series of ports $1^c$, $2^c$, $3^c$ and $4^c$, and $1^d$, $2^d$, $3^d$ and $4^d$, which series of ports are controlled by the auxiliary valve heads $y$ and $x$ respectively, for admitting pressure to and exhausting pressure from the end pressure surfaces of the auxiliary valves $b$, the arrangement of ports and passages in the regulator being such that when pressure is supplied to one end pressure surface of an auxiliary valve $b$ for moving the valve in one direction, the opposite end pressure surface of the valve is opened to the atmosphere, and vice versa.

The branch pipes $1^b$, $2^b$, $3^b$ and $4^b$ as shown, communicate respectively with the chambers 10 in the valve chest Z, separated from the chambers 11 by the bridges 12, and the chambers 10 and 11 communicate with the main valve chambers $a$ by means of the ports 13 and 14 respectively. Slides 15, carried by the main regulator valves $b$, control the ports 13 and 14 and these slides may be in the form of shoes held between the shoulders 16 on the valve stems $d$ and prevented from rotating by means of the transverse pins 17. The main valves $b$ may be guided and prevented from rotating by means of the dowels 18.

Gaskets 19, of any suitable material as rubber or fiber, are preferably placed between the valve chest Z and the end plate $k$ and cover $p$, and properly perforated to conform to the ports and passages in the parts of the regulator. The material of the gaskets preferably over-laps the main regulator valve chambers $a$ at the points 20, in order to form a cushion and a seal for the main regulator valves against which overlapping portions of the gaskets the valve heads impinge in their operation. Removable plugs 21 closing the apertures 22 in the cover $p$, in axial alignment with the main regulator valves, afford accessibility to the interior of the regulator and permit oiling.

The fluid pressure lever Y which actuates the central auxiliary valve $f$ may be of any suitable form or construction, but in this instance is in the form of an arm pivoted at 23 to the frame or support 24, carrying adjustable weights 25 at its outer end. The lever rests on the upper end of a pin 26 supported in the guide 27, carried by the diaphragm 28 which is subjected to receiver pressure from the receiver S through the pipe $h$. A given increase of pressure in the receiver will expand the diaphragm 28 and carry the lever Y upwardly, thus moving the auxiliary regulator valve $f$ upwardly a given distance. A coiled spring 29, supported between the regulator frame 30 and the cap 31 pinned to the rod 32, which is pivoted to the lever Y at the point 33, resists the upward movement of the lever Y. A stop 34 on the rod 32 limits the downward movement of the lever.

In the operation of the apparatus, let it be assumed that the compressor has been operating with all the clearance valves T closed, and held in closed position by the receiver pressure behind the heads V of the valves. The lever Y would then be at the limit of its downward movement and all the main regulator valves $b$, would be in their upward position, as Figure 4 is viewed, that is they would all be in the position of the main regulator valve $b$ at the right of said figure, and the auxiliary regulator valve $f$ would be at the limit of its downward travel. In such case, receiver pressure through the pipes $h$ and $j$, and the main inlet pipe $g$ would pass directly to all four main regulator valve chambers $a$, thence through the ports 13 and chambers 10 to the branch pipes $1^b$, $2^b$, $3^b$ and $4^b$ and the remaining pipes connected thereto, to the respective valve casings of the clearance valves on both cylinders.

The main regulator valves $b$ would all be held in upward position, as Figure 4 is viewed, due to receiver pressure from the main inlet passage $g$ through the respective series of ports $1^c$, $2^c$, $3^c$, and $4^c$, thence through the chambers 34, ports 35 and 36 and passages 37 and to the end pressure surfaces of the main regulator valve heads $c$, tending to hold the valves upward. The opposite end pressure surfaces of the main regulator valves on the opposite heads $c$, are open to exhaust through the passages 38, ports 39 and 40, chambers 41 and the series of ports $1^d$, $2^d$, $3^d$ and $4^d$ and thence around the auxiliary regulator valve $f$ directly to the exhaust passage $s$.

Let it then be assumed that there is a sufficient increase of receiver pressure beneath the diaphragm 28 of the lever Y to raise the lever and the auxiliary valve $f$ the first step to the position of the auxiliary valve $f$ indicated in Figure 4, so that the auxiliary valve heads $y$ and $x$ have uncovered the ports $1^c$ and $1^d$. The lower end pressure surface of one main regulator valve $b$ controlling the branch pipe $1^b$, leading to the clearance valves T in the valve casings 1, will be exhausted to atmosphere through the exhaust pipe $t$. Receiver pressure is also admitted to the opposite end pressure surface of the said main regulator valve $b$ from the main inlet pipe $g$ through the port $1^d$, chamber 41, ports 40 and 39, and passage 38, to the main valve chamber $a$ for said valve. The valve will be thrown to its opposite position and the slide 15 places the ports 13 and 14 in communication, which permits the receiver pressure behind the heads V of the clearance valves T in the valve casings 1, to exhaust through the pipe $1^a$, branch pipe $1^b$ and chambers 10 and 11, in the valve chest Z, directly to the exhaust passage $s$.

The springs W on the valve stems U of the clearance valves T, assisted by the pressure in the compressor cylinder, open the clearance valves and unload the compressor the desired degree. At successively attained receiver pressures, the pairs of clearance valves are successively opened as the auxiliary regulator valve $f$ continues to uncover pairs of ports in the two series of ports $1^c$, $2^c$, $3^c$ and $4^c$, and $1^d$ $2^d$, $3^d$ and $4^d$. The pairs of clearance valves are successively closed automatically as the auxiliary regulator valve $f$ is moved in the opposite direction.

I am not to be understood as limiting the invention to the details of construction shown and described since those skilled in the art may devise equivalent constructions for carrying out my invention, as defined in the appended claims. The principles of construction, however, have enabled me to produce a simple compact regulator of the type described, in which all of the operating parts are assembled about a common center, so that the ports and passages are short and radiate from a common center. Space is saved and at the same time, the essential parts of the regulator may be readily inspected, assembled, disassembled and lubricated.

I claim:

1. A regulator for fluid compressors, comprising a valve chest, a plurality of main valve chambers in said chest arranged around a common center, fluid actuated main regulator slide valves independent of the compressor valves and longitudinally movable in said main valve chambers directly controlling ports and passages and thereby controlling the loading and unloading of the compressor, an auxiliary valve chamber located centrally in the valve chest between said main valve chambers, and a fluid pressure actuated auxiliary valve longitudinally movable in said auxiliary valve chamber for controlling the movements of the said main regulator slide valves, the said main valves and auxiliary valve having their longitudinal axis substantially parallel to each other.

2. A regulator for fluid compressor, comprising a valve chest, a plurality of main valve chambers extending through said casing from end to end and arranged around a common center, fluid actuated main regulator slide valves independent of the compressor valves and longitudinally movable in said main valve chambers directly controlling ports and passages and thereby controlling the loading and unloading of the compressor, an auxiliary valve chamber extending centrally through the valve chest from end to end between said main valve chambers, a fluid pressure actuated auxiliary valve longitudinally movable in said auxiliary valve chamber for controlling the movements of the said main regulator slide valves, the said main valves and auxiliary valve having their longitudinal axes substantially parallel to each other, and removable chambered covers for the ends of the said valve casing.

3. A regulator for fluid compressors, comprising a valve chest, a plurality of main valve chambers in said chest arranged around a common center, fluid actuated main regulator valves longitudinally movable in said main valve chambers for controlling the loading and unloading of the compressor, an auxiliary valve chamber located centrally in the valve casing between the said main valve chambers, a fluid pressure actuated auxiliary valve longitudinally movable in said auxiliary valve chamber for controlling the movements of the said main regulator valves, and a common inlet passage extending transversely through the valve chest and centrally intersecting all of the main valve chambers and the auxiliary valve chamber.

4. A regulator for fluid compressors, comprising a valve chest, a plurality of main valve chambers extending through said chest from end to end and arranged around a common center, fluid actuated main regulator valves longitudinally movable in said main valve chambers for controlling the loading and unloading of the compressor, an auxiliary valve chamber extending centrally through the valve chest from end to end between said main valve chambers, a fluid pressure actuated auxiliary valve longitudinally movable in said auxiliary valve chamber for controlling the movements of the said main regulator valves, a common inlet passage extending transversely through the valve chest and centrally intersecting all of the main valve chambers and the auxiliary valve chamber, and removable covers for the ends of said valve casing.

In testimony whereof I have signed this specification.

CHESTER W. METZGAR.